Patented Sept. 8, 1931

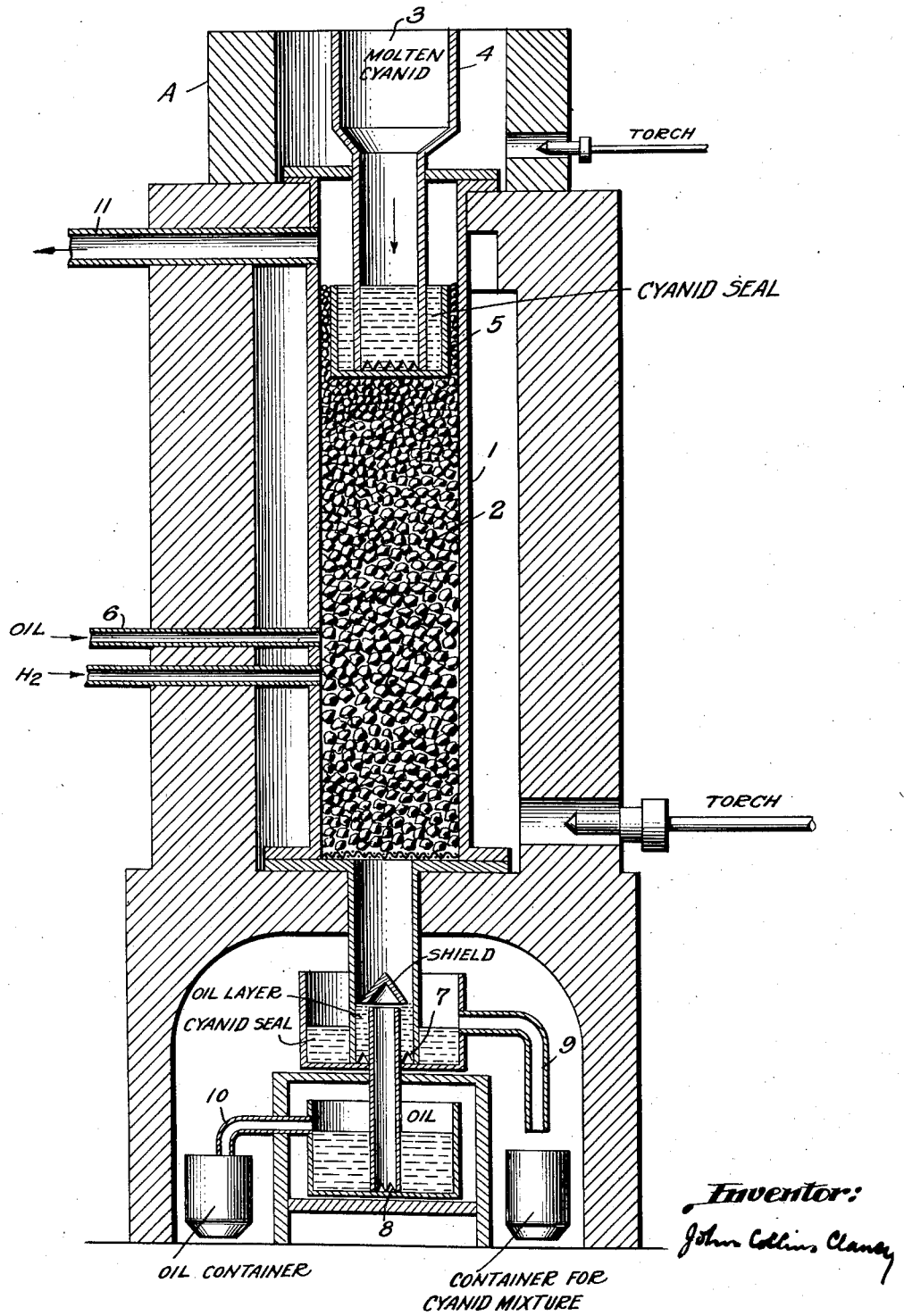

1,822,127

UNITED STATES PATENT OFFICE

JOHN COLLINS CLANCY, OF ASBURY PARK, NEW JERSEY

TREATMENT OF HYDROCARBONS

Application filed April 29, 1930. Serial No. 448,413.

My invention relates to the catalytic thermal decomposition of the heavier hydrocarbons with a molten catalyzer, and its principal objects are to increase the yield of aromatic hydrocarbons and to employ as the catalyzer a cyanogen salt of a metal in a fused mixture of such a salt and another salt which will prevent the generation or liberation of hydrocyanic acid from such catalyzer when the latter, at a cracking temperature, is contacted with the hydrocarbon material to be treated. The present invention is an improvement on my prior U. S. Patent No. 1,658,116, February 7, 1928—entitled "Process of cracking oils."

In the aforesaid prior patent I have described and claimed different phases of a process, and some apparatus for practising the same, involving the cracking of heavier hydrocarbons by contacting them, in the presence of a metallic catalyst, with molten compositions consisting predominantly of alkali metal cyanide, (a preferred composition being a molten mixture of sodium cyanide and sodium thiocyanate) the carbon separated out in the treatment of the oil and which accumulates in the molten material being discharged from the converting system as a carbon bearing molten magma; continuation of the process being carried out in a cycle as by filtering the accumulated carbon from the molten material and employing the latter over and over again after having, if necessary, been replenished with fresh sodium cyanide for the treatment of further quantities of the oil feed stock. On continued use of this method, however, a difficulty became apparent, unforeseen when operating on the small scale; namely that hydrocyanic acid gas was evolved or generated from the molten material, thereby causing destruction not only of alkali metal cyanide, but also creating a hazard on account of the poisonous nature of the evolved gas. Investigations have shown that alkali metal thiocyanate was responsible for the stated generation of hydrocyanic acid gas, whether such thiocyanate was formed through interaction of the oil sulphur compounds with the molten sodium cyanide, as when the latter was used alone as the molten starting material, or when a molten mixture of sodium cyanide and sodium thiocyanate was employed as the starting material for contacting the oil feed stock for the production of lower boiling point hydrocarbons.

I have therefore sought and have found such a combination of substances as will not only permit of a reduction in the quantity of alkalinous metal cyanide in molten compositions employed for the catalytic thermal decomposition of a given quantity of the oil feed stock for the production of lower boiling point hydrocarbons, but which will further afford a means of preventing the evolution or generation of hydrocyanic acid gas from the cyanide contained in such compositions while the latter are contacting with the oil under treatment, irrespective of whether such oil contains relatively high percentages of sulphur or acid compounds or both; moreover, while satisfactorily accomplishing these results, I have succeeded in going still further, in that my present process not alone affords a reduction in the quantity of cyanide, but actually gives more than 50% yield of aromatic hydrocarbons and 20% gasoline from, for example a kerosene oil stock without excessive formation of carbon and fixed gases.

The present invention is based upon the discovery that an alkaline reacting substance or reagent such, for example, as sodium carbonate in a fused mixture of such a salt and an alkalinous metal cyanide, such for instance, as sodium cyanide, has the effect of preventing the evolution or generation of hydrocyanic acid gas from the cyanide component of said mixture when the latter is employed as a molten catalyzer for contacting hydrocarbon oils or the vapors thereof for the production therefrom of lower boiling point products. The protective action of the alkali metal carbonate, when admixed in sufficient quantity with the cyanide, being so complete that proportionate quantities of hydrocyanic acid gas may be bubbled into a bath of the fused mixture to react with the alkali carbonate to form alkali metal cyanide without escape of hydrocyanic acid from the molten bath. A preferred starting composition for the molten catalyzer material being 35% sodium carbonate and 65% sodium cyanide; such a composition forming a eutectic mixture having a melting point below 450° C., this melting point usually becoming lower as the molten catalytic material desulphurizes the oil feed stock with more or less formation of alkali sulphides and alkali thiocyanates and separation of carbon like material in the molten catalyzer. Experimentation has shown that it is not necessary to filter out or remove the carbon (as described in my aforesaid prior patent) from the molten material until it accumulates therein to near its saturation point, and then removing only a portion of such carbon as I have discovered that the carbon like material formed from the oil treatment exercises not only a specific catalytic effect in conjunction with the molten catalyzer to increase its activity in promoting the aforesaid high yields of aromatic hydrocarbons, but it also enables the splitting temperature to be lowered, thereby diminishing carbon formation and decreasing the formation of fixed gases when such a carbon bearing molten catalyzer is employed for the treatment of further quantities of the oil feed stock.

Furthermore, I have found that the employment of a metallic catalyst in conjunction with the molten catalyzer compositions referred to, is not necessary for the stated oil cracking reaction and that the said molten cyanide compositions even when contaminated with relatively large percentages of sulphur and other impurities derived from the oil stock do not decrease the activity of the molten catalyzer provided that sodium carbonate and sodium cyanide are the predominating components of said catalyzer. In fact, said impurities increase the catalyzer activity.

I may use any of a number of catalytically operating alkalinous metal cyanogen compounds which are fusible at relatively low temperatures in admixture with an alkalinous metal carbonate or a plurality of different compounds of one or more cyanides in admixture with one or more alkali carbonates. Ordinarily I find that alkali metal cyanides are better than the alkaline earth cyanides and I shall therefore speak more specifically hereinafter of the alkali metal cyanides and alkali metal carbonates. Sodium cyanide is well adapted for my present process. Potassium cyanide is also well adapted. Mixtures of sodium cyanide with potassium carbonate or mixtures of potassium cyanide with sodium carbonate form very low melting point eutectic mixtures which may be used for special purposes but offer no substantial advantages over a eutectic mixture of sodium cyanide and sodium carbonate for general use as the starting molten catalyst material. Obviously, cyanogen compounds, such as sodium cyanate, potassium cyanate or other oxygen bearing cyanogen compounds which become reduced to cyanides in the presence of carbon or a hydrocarbon at the temperature maintained in the cracking operation might be employed in combination with an alkali metal carbonate as the starting material but such mixtures would offer no material advantage over simple mixtures of alkali metal cyanide and alkali metal carbonates. Similarly, alkali metal hydroxides such as sodium hydroxide or potassium hydroxide might be used in starting material in lieu of the corresponding carbonates but, here again, no advantage from their use would accrue as during the operation of the process such hydroxides are transformed to their correspondent carbonates.

In one specific embodiment of my invention as applied to any high boiling hydrocarbon oil, such as the various high boiling crude oils and derivatives thereof; pressure distillates, fuel oil, still residuums, shale oil, gas oil, tar oil and even cracked gasoline and similar cracked petroleum products, I first charge a mixture comprising 35% sodium carbonate and 65% sodium cyanide, preferably in the molten condition, into a closed vessel or still made of any suitable material, such as chrome iron alloy. The charging is continued until the still is about half filled with the starting molten eutectic mixture which comprises the molten catalyzer. Alternately, the molten catalyzer employed may be that produced by treating the cyanide containing residue of a previous oil cracking and distilling operation with ammonia, as hereinafter referred to. The catalyzer is maintained in the molten condition within the still by the application of heat thereto. The oil, for example, a gas oil preferably though not necessarily in the vaporized condition, is introduced at a low point in the still so that it enters well below the surface of the bath or depth of the molten catalyzer, the latter being maintained at a temperature between 500° C. and 650° C. or higher. A good expedient is to provide a shallow depth layer of molten lead underlying the molten cyanide mixture and have the oil feed pipes enter beneath the surface of the same so that in case of stoppage of the oil in the feed line, with a resulting partial vacuum therein, the molten lead is sucked up in lieu of the molten cyanide, the latter being of less specific gravity otherwise is sucked up out of the heat zone solidifying in and clogging the oil line, the former owing to its high specific gravity is not sucked up out of the heat zone and on resumption of the oil feed, the molten lead is forced out of the oil feed pipes leaving them clear for continuation of the oil treatment. As the vaporized oil is injected, it commingles with the molten catalyzer and the generated vapors resulting from such contact pass upwardly through the depth or bath of the molten catalyzer, said vapors upon condensation yield a distillate containing a high percentage of aromatic hydrocarbons. When the molten catalyzer charge in the still has engaged its quota of oil, said quota depending upon whether the proportion of separated carbon suspended in the molten material has formed therewith a free flowing cyanide containing distillation residuum easily dischargeable from the still as more or less partly spent catalytic material; usually, however, when the carbon accumulates to near its saturation point, as for example, 50 to 75% of carbon in the molten mixture of sodium carbonate and sodium cyanide, I discontinue the feed of the oil stock to the still but continue the heating thereof until the said partially spent catalytic material is ready for discharging. When this occurs the charge is finally dumped and replaced by a new one, the new one being preferably a catalyzer produced by treating partially spent catalytic material from a previous oil cracking operation as referred to hereinunder. The time and usefulness of a charge may be prolonged somewhat by making additions thereto of fresh cyanide. In fact, a charge thus replenished and even though contaminated with relatively high percentages of sulphur compounds functions actively in the conversion of further quantities of oil stock to low boiling aromatic hydrocarbons provided, as noted, a sufficient quantity of alkali metal carbonate is present in the said replenished catalyzer. During the operation of the process the distillation products are suitably fractionated or condensed into products desired for motor fuel or gasoline like material. The heavier oils separated by such fractionation being returned to the process for conversion into lighter oils. The uncondensable gases which escape from the final condensing system being used, in part at least for heating purposes, etc.

The discharged distillation residues or partly spent molten catalytic material which has become unsuitable for further use in the oil conversion may be regenerated by treating it in a cyanide making retort, according to the well known Beilby process for manufacturing cyanides from a molten mixture of alkali cyanide, alkali carbonate and carbon. For example, by simply heating the partially spent molten catalyzer between 800° C. to 900° C. and bubbling a proportionate quantity of ammonia therethrough, a cyanide forming reaction takes place resulting in a disappearance of carbon in proportion to the quantity of alkali carbonate and other alkali compounds in the spent material, with the production of a corresponding proportion of alkali cyanide. Usually, however, about 35% of the original carbon content of the spent material remains unconsumed but in a highly activated form. In this way regenerated catalytic material is obtained containing active carbon which after admixture of the same with its quota of alkali carbonate, produces a catalyzer having much greater catalytic activity than one prepared from fresh starting materials.

In another embodiment of my invention I operate in a continuous manner and employ a continuous feed of previously prepared molten catalytic material so as to obviate, in part at least, the overheating of the walls of the retort wherein the molten catalyzer adjacent thereto becomes more or less superheated, resulting in a disproportionate formation of carbon and fixed gases at the cracking temperature employed. In carrying this embodiment of my invention into practise an arrangement like a column still or scrubbing tower retort is employed. This retort being preferably constructed of chrome iron alloy and having a filling of packing units for filming out the molten catalyzer, said packing units being composed of good heat conducting material, such for example, as masses of iron shaped in the form of the so called Raschig rings, about one inch in diameter.

In the drawing which forms a part hereof, I have exemplified an apparatus whereby the process may be carried into effect.

In said drawing, the figure shows a vertical section of a column still or retort containing the packing units, and provided with gas and other connections, hereinafter described.

The retort 1, filling of packing units 2, is heated in part by the heat contained in the previously prepared molten cyanide and alkali carbonate mixture 3, and is kept molten in the funnel charging hopper 4, by the external heat supplied by furnace A. The molten cyanide material flows over the edge of the trap pot 5, and trickles downwardly through the packing units countercurrent to a flow of hydrocarbon oil vapor supplied through pipe 6, from an adjoining still or the oil may be sprayed directly into the column still at or near the middle thereof as at 6. The lower end of the column still or retort is closed to the atmosphere and is provided with the sealed outlets 7 and 8 for the molten reaction products and unvaporized oil respectively. At the upper end of the column still or retort is an outlet 11, for the hydrocarbon vapors and gases resulting from the oil treatment in contact with the molten catalyzer material filming over the packing units. Molten cyanide catalyzer material and the hydrocarbon oil or vapor to be treated are continuously supplied as at 3, and 6, to the column still or retort at the top and bottom respectively and converted hydrocarbons and molten reaction products are withdrawn from the retort as at 11, 9 and 10 at top and bottom respectively, the temperature of the column still or retort being maintained and controlled by the heat supplied by the furnace B.

It is obvious that, the discharged molten material may be circulated through the column still until it contains sufficient carbon in suspension to justify its treatment for the regeneration of the catalytic material by treatment with ammonia at cyanide forming temperatures in the manner already described.

The vapors and gases emanating from the retort may pass into a dephlegmator, which may be suitably arranged to yield as fractions a gas oil or any unconverted heavier oil. Either or both of these products may be returned to the reaction zone of the retort for further decomposition if desired.

The lighter oils or volatile spirits are condensed in either a dephlegmator or condensor of any of the well known types as already referred to.

The drawing accompanying this application is the same as the one shown in my said prior patent; it is reproduced here for the purpose of illustration and reference. Many other types of retort or stills which employ fused material as a cracking instrumentality are applicable provided they are constructed of suitable material, such, for example as chrome iron alloy or similar material which can withstand the action of the molten catalyzer.

The stated cracking operation may be carried on under pressure greater than atmospheric, at atmospheric pressure or under reduced pressure. However, when operating the above described column still or scrubbing tower retort I prefer to operate at a pressure not substantially higher than that which is necessary to force the generated vapors and gases through any of the well known types of dephlegmators and condensing systems. Pressure may be used but it has been found that the product contains a relatively large content of olefines without a proportionate increase in the aromatic hydrocarbons. Temperatures from 450° C. to 650° C. and higher may be employed but the best results have been obtained between 500 and 530° C. The process may be operated above 650° C. but larger yields of fixed gases are obtained and to avoid this, the lower temperatures are employed.

From the presence of alkali sulphur compounds, such as sodium sulphide and sodium thiocyanate in the partially spent molten catalyzer material it is obvious that the components of the latter act as desulphurizing agents while concurrently functioning as the catalyzer to promote the stated oil conversion reaction. The percentage of said alkali sulphur compounds, however, does not increase in proportion to the percentage of sulphur compounds in the oil which has been contacted or treated with the molten catalyzer. For example, after bubbling a measured quantity of a Mexican petroleum pressure distillate, assaying 2% sulphur, through a three foot depth of the molten catalyzer contained in a four inch diameter retort, there was obtained a condensate which after the usual treatment with sulphuric acid and alkali assayed less than one tenth of one per cent sulphur. Analysis of the partially spent catalyzer material, however, showed it to contain less than 5% of the sulphur content of the original oil stock or distillate after figuring proportionate quantities of the oil and catalyzer material. Assay of the condensate prior to its treatment with sulphuric acid and alkali showed it to contain nearly 65% of the sulphur content of the original oil or distillate. Analysis of the evolved gases which escaped condensation showed them to contain nearly 30% of the sulphur content of the oil feed stock (pressure distillate), the sulphur in said gases being present chiefly in the form of hydrogen sulphide. Experimentation, however, has shown that the proportion of sulphur abstracted from the oil by the molten catalyzer material varies according to the nature of the sulphur compounds in the oil feed stock. It has also been found that by admixing hydrogen and particularly ammonia with the vapors of the oil feed stock a much larger proportion of the sulphur content of the oil is transformed into hydrogen sulphide, irrespective of the nature of the sulphur compounds present in the oil feed stock or the vapors thereof.

In the regeneration of the partly spent catalytic material by the action of ammonia thereon at cyanide forming temperatures, the alkali sulphur compounds therein are eliminated in the form of hydrogen sulphide. For example, sodium thiocyanate is reduced to cyanide by the action of the ammonia, the hydrogen of the latter combining with the sulphur to form hydrogen sulphide. Alkali sulphides react with the ammonia in the presence of the carbon forming alkali cyanide with the elimination of hydrogen sulphide. Traces of sulphides remain, but as pointed out these together with the unconsumed carbon produce catalytic material having much greater activity than fresh starting materials.

I lay no claim to the regeneration or reclamation of the cyanide except insofar as to produce a catalyzer from the spent material as already described. It is to be understood that the details of operation herein set forth are given merely for the purpose of affording a better understanding of my invention and that the invention is limited only by the scope of the appended claims.

What I claim as my invention is:

1. A process of treating a hydrocarbon oil which comprises vaporizing the hydrocarbon oil and cracking the vaporized oil by contact with a catalyzer comprising a cyanogen salt of an alkalinous metal in a molten mixture of such a salt and another salt which is capable of preventing the decomposition products of the oil from liberating hydrocyanic acid from such mixture while the latter is decomposing the oil at a cracking temperature.

2. A process of cracking and distilling higher boiling point hydrocarbon oils for the production of lower boiling point hydrocarbons which comprises, contacting such a higher boiling point oil with a molten catalyzer produced by treating with ammonia at cyanide forming temperatures the cyanide containing distillation residuum resulting from the cracking of a hydrocarbon oil with a molten mixture of alkali metal cyanide and alkali metal carbonates, said catalyzer having sufficient alkali metal carbonate added thereto to prevent the decomposition products of the oil under treatment from liberating hydrocyanic acid from the molten catalyzer while the latter is maintained at a cracking temperature.

3. A process of treating hydrocarbon oils which comprises subjecting such an oil to catalytic thermal decomposition by contacting it with a cyanogen salt of an alkali metal in a molten mixture of such a salt and an alkaline reacting metallic salt which is capable of preventing the liberation of hydrocyanic acid from such mixture while the latter is decomposing the oil at a cracking temperature.

4. A process of treating hydrocarbon oils which comprises subjecting such an oil to catalytic thermal decomposition by contacting it, at a cracking temperature, with a molten catalyzer produced by treating the partially spent cyanide containing catalyzer from a previous oil cracking operation with ammonia at cyanide forming temperatures, said catalyzer having sufficient sodium carbonate added thereto to prevent the decomposition products of the oil being treated from liberating hydrocyanic acid from said molten catalyzer while the latter is maintained at a cracking temperature.

5. The process of cracking hydrocarbon material having a lower aromatic hydrocarbon content than the desired products to motor fuel having a relatively high aromatic hydrocarbon content which comprises, bringing said hydrocarbon material into contact, at a cracking temperature, with a molten mixture of alkali metal carbonate and alkali metal cyanide containing accumulated carbon like material separated out in the cracking operation, said mixture containing sufficient alkali metal carbonate to prevent the decomposition products of the hydrocarbons under treatment from liberating hydrocyanic acid from the molten mixture while the latter is maintained at a cracking temperature, and condensing the evolved vapors.

6. The process of cracking hydrocarbons having a higher molecular weight than the desired products to gasoline like material containing relatively high percentages of aromatic hydrocarbons which comprises bringing the hydrocarbon vapors into contact, at a temperature above 400° C., with a molten eutectic mixture of alkali metal carbonate and alkali metal cyanide, and condensing the evolved vapors.

7. The process of treating a hydrocarbon oil which comprises vaporizing the hydrocarbon oil and cracking the vaporized oil by contact with a catalyst comprising sodium cyanide in a molten mixture of such a salt and another salt which is capable of preventing the liberation of hydrocyanic acid from such mixture while the latter is decomposing the oil at a cracking temperature.

8. A process of cracking and distilling higher boiling point hydrocarbon oils containing sulphur for the production of lower boiling point desulphurized hydrocarbons which comprises, contacting such a higher boiling point oil with a molten catalyzer produced by treating with ammonia at cyanide forming temperatures the cyanide and sodium carbonate containing distillation residuum resulting from the cracking of a hydrocarbon oil with a molten mixture of sodium carbonate and sodium cyanide, said catalyzer having sufficient sodium carbonate added thereto to prevent the evolution of hydrocyanic acid from said catalyzer while the latter is decomposing the oil at a cracking temperature.

9. The process of cracking hydrocarbon material having a lower aromatic hydrocarbon content than the desired products to motor fuel containing relatively large percentages of aromatic hydrocarbons which comprises, bringing said hydrocarbon material into contact with a molten mixture of sodium carbonate and sodium cyanide containing accumulated carbon like material separated out in the oil cracking operation, said mixture containing sufficient sodium carbonate to prevent the generation of hydrocyanic acid from said molten mixture while the latter is decomposing the oil at a cracking temperature, and collecting the lighter oils formed as a result of such cracking.

10. In a process of manufacturing lower boiling point oils from higher boiling point hydrocarbon oils containing sulphur compounds the steps comprising, contacting such a higher boiling point oil with a molten mixture of sodium carbonate and sodium cyanide maintained at a cracking temperature, the ingredients being proportioned so that such mixture has a lower melting point than any of its constituents; continuing the contacting of the oil with the molten mixture until a stage is reached wherein the carbon separated from the oil accumulates to its saturation point in the molten mixture, and condensing the evolved vapors.

11. A process of treating hydrocarbon oils containing sulphur compounds which comprises subjecting such an oil to catalytic thermal decomposition by contacting it with a molten mixture of sodium carbonate and sodium cyanide in such proportions as to give such mixture a melting point of less than 600° C. and maintaining the same at a cracking temperature during the contact of the oil therewith, and condensing the evolved vapors.

12. The process of making gasoline like material from heavy hydrocarbon oils containing sulphur compounds which comprises cracking and desulphurizing such a heavy oil by contacting it with a molten mixture of sodium carbonate and sodium cyanide in the presence of substantial quantities of carbon separated out in the reaction, the sodium carbonate being present in sufficient quantity in such mixture so as to prevent the sulphur decomposition products of the oil from liberating hydrocyanic acid from the molten mixture while the latter is maintained at a cracking temperature, and condensing the evolved vapors.

Signed at Asbury Park in the county of Monmouth and State of New Jersey, this 22d day of April, A. D. 1930.

JOHN COLLINS CLANCY.